US012712306B2

(12) United States Patent
Szu

(10) Patent No.: US 12,712,306 B2
(45) Date of Patent: Aug. 18, 2026

(54) ELECTRICAL CONNECTOR WITH IMPROVED TERMINALS

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventor: Ming-Lun Szu, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 326 days.

(21) Appl. No.: 18/372,378

(22) Filed: Sep. 25, 2023

(65) Prior Publication Data

US 2024/0106147 A1 Mar. 28, 2024

(30) Foreign Application Priority Data

Sep. 26, 2022 (CN) ......................... 202211174089.4
Sep. 26, 2022 (CN) ......................... 202222544128.7

(51) Int. Cl.
*H01R 13/405* (2006.01)
*H01R 12/71* (2011.01)
(Continued)

(52) U.S. Cl.
CPC ....... *H01R 13/2435* (2013.01); *H01R 12/714* (2013.01); *H01R 13/2414* (2013.01); *H01R 13/405* (2013.01); *H01R 13/652* (2013.01)

(58) Field of Classification Search
CPC ............ H01R 13/2435; H01R 12/7076; H01R 12/714; H01R 12/716; H01R 13/2414;
(Continued)

(56) References Cited

U.S. PATENT DOCUMENTS

| | | | | | |
|---|---|---|---|---|---|
| 4,906,194 | A * | 3/1990 | Grabbe | ................ | H01R 12/714 439/71 |
| 4,927,369 | A * | 5/1990 | Grabbe | ................ | H01R 12/714 439/82 |

(Continued)

FOREIGN PATENT DOCUMENTS

| | | |
|---|---|---|
| CN | 107946805 A | 4/2018 |
| CN | 208571015 U | 3/2019 |

(Continued)

*Primary Examiner* — Abdullah A Riyami
*Assistant Examiner* — Thang H Nguyen
(74) *Attorney, Agent, or Firm* — Ming Chieh Chang

(57) ABSTRACT

An electrical connector includes: an insulative housing; and plural terminals disposed in the insulative housing, each of the first terminals having a main part retained in the housing and an upper elastic arm extending obliquely and upwardly from the main part, the upper elastic arm having an upper-arc contacting portion and an upper end bending downward from the upper-arc contacting portion, wherein the upper end defines a first contacting face, the main part defines a second contacting face confronting with the first contacting face, at least one of the first contacting face and the second contacting face is of an inclined face to guide the upper end of the upper elastic arm to contact with the main part, and the first and second contacting faces contact with each when the upper elastic arm moves toward the main part.

20 Claims, 11 Drawing Sheets

(51) Int. Cl.
*H01R 13/24* (2006.01)
*H01R 13/652* (2006.01)

(58) Field of Classification Search
CPC .... H01R 13/245; H01R 13/405; H01R 13/41; H01R 13/6471; H01R 13/652; H01R 13/6585
USPC .................................. 439/66, 607.07, 607.08
See application file for complete search history.

(56) References Cited

U.S. PATENT DOCUMENTS

| | | | | | |
|---|---|---|---|---|---|
| 5,230,632 | A * | 7/1993 | Baumberger .......... | H01R 13/03 439/74 |
| 5,484,295 | A * | 1/1996 | Mowry .................. | H01R 12/52 439/65 |
| 5,653,598 | A * | 8/1997 | Grabbe ................ | H05K 7/1069 439/74 |
| 5,984,693 | A | 11/1999 | McHugh et al. | |
| 7,052,284 | B2 * | 5/2006 | Liao ................... | H01R 13/2435 439/862 |
| 7,160,115 | B2 * | 1/2007 | Huang ............... | H01R 13/2435 439/66 |
| 7,186,119 | B2 * | 3/2007 | Perugini ............ | H01R 13/2435 439/862 |
| 7,785,112 | B2 * | 8/2010 | Hashimoto ........ | H01R 12/7076 439/66 |
| 7,942,677 | B2 | 5/2011 | Rikimaru et al. | |
| 9,425,525 | B2 * | 8/2016 | Walden .............. | H01R 12/7082 |
| 10,199,756 | B2 * | 2/2019 | Ju ...................... | H01R 13/2464 |
| 10,833,441 | B2 * | 11/2020 | Hsu ...................... | H01R 13/428 |
| 2009/0111289 | A1 | 4/2009 | Vinther | |
| 2013/0323970 | A1 * | 12/2013 | Wang .................. | H01R 13/658 439/607.08 |
| 2014/0065893 | A1 | 3/2014 | Vinther | |
| 2020/0169019 | A1 * | 5/2020 | Cheng .................. | H01R 12/724 |
| 2021/0305754 | A1 * | 9/2021 | Ho ..................... | H01R 12/7082 |
| 2025/0372913 | A1 * | 12/2025 | Wu ........................ | H01R 13/46 |

FOREIGN PATENT DOCUMENTS

| | | | |
|---|---|---|---|
| CN | 108110455 | B | 8/2020 |
| CN | 113783011 | A | 12/2021 |

* cited by examiner

ELECTRICAL CONNECTOR WITH IMPROVED TERMINALS

BACKGROUND OF THE INVENTION

Field of the Invention

The present invention relates to an electrical connector for use with an electronic package.

Description of Related Arts

U.S. Pat. No. 5,653,598A discloses a connector for connecting a chip to a mother board, including an insulative housing and a plurality of terminals disposed in the insulative housing. Each terminal includes an upper elastic arm with an upper end and a lower elastic arm with a lower end, the upper end has a first contacting face and the lower end has a second contacting face, the first contacting face and the second contacting face contact with each other when the upper elastic arm and the lower elastic arm are pressed respectively. As the contacting face of the two elastic arms can only be achieved when the upper and lower elastic arms move in a correct way at the same time. It is hard to make the contacting face of the upper and lower elastic arms move in the correct way at the same time and often leads a poor contact between the two, resulting in signal transmission failure.

Therefore, it is desired to provide an electrical connector with improved terminals.

SUMMARY OF THE INVENTION

An object of the present invention is to provide an electrical connector with improved terminals.

To achieve the above object, an electrical connector comprises: an insulative housing; and a plurality of first terminals disposed in the insulative housing, each of the first terminals comprising a main part retained in the housing and an upper elastic arm extending obliquely and upwardly from the main part, the upper elastic arm having an upper-arc contacting portion and an upper end bending downward from the upper-arc contacting portion, wherein the upper end defines a first contacting face, the main part defines a second contacting face confronting with the first contacting face, at least one of the first contacting face and the second contacting face is of an inclined face to guide the upper end of the upper elastic arm to contact with the main part, and the first and second contacting faces contact with each when the upper elastic arm moves toward the main part.

Other advantages and novel features of the invention will become more apparent from the following detailed description of the present embodiment when taken in conjunction with the accompanying drawings.

DETAILED DESCRIPTION OF THE PREFERRED EMBODIMENTS

Figure 1:
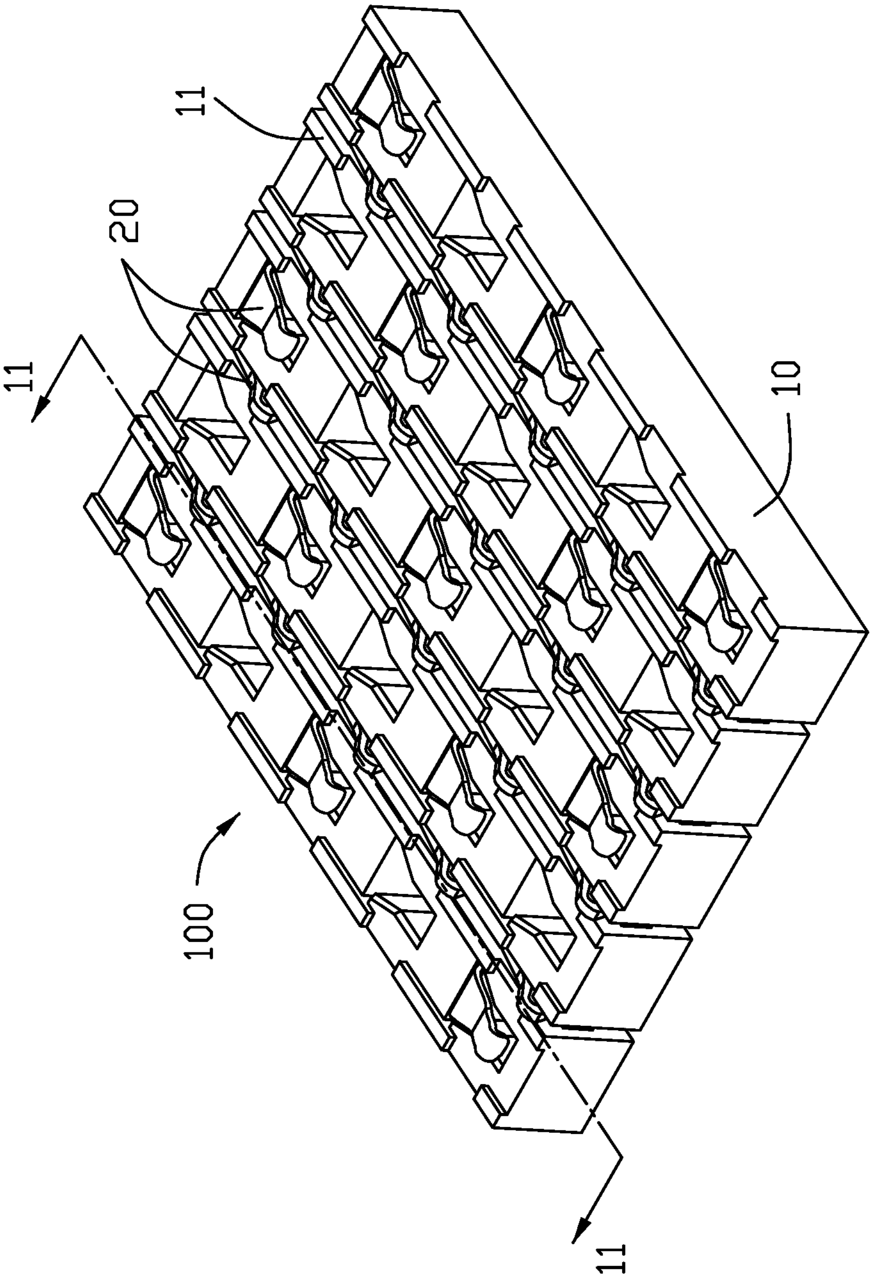
FIG. 1 is a perspective view of an electrical connector according to a first embodiment of this present invention.
Figure 2:
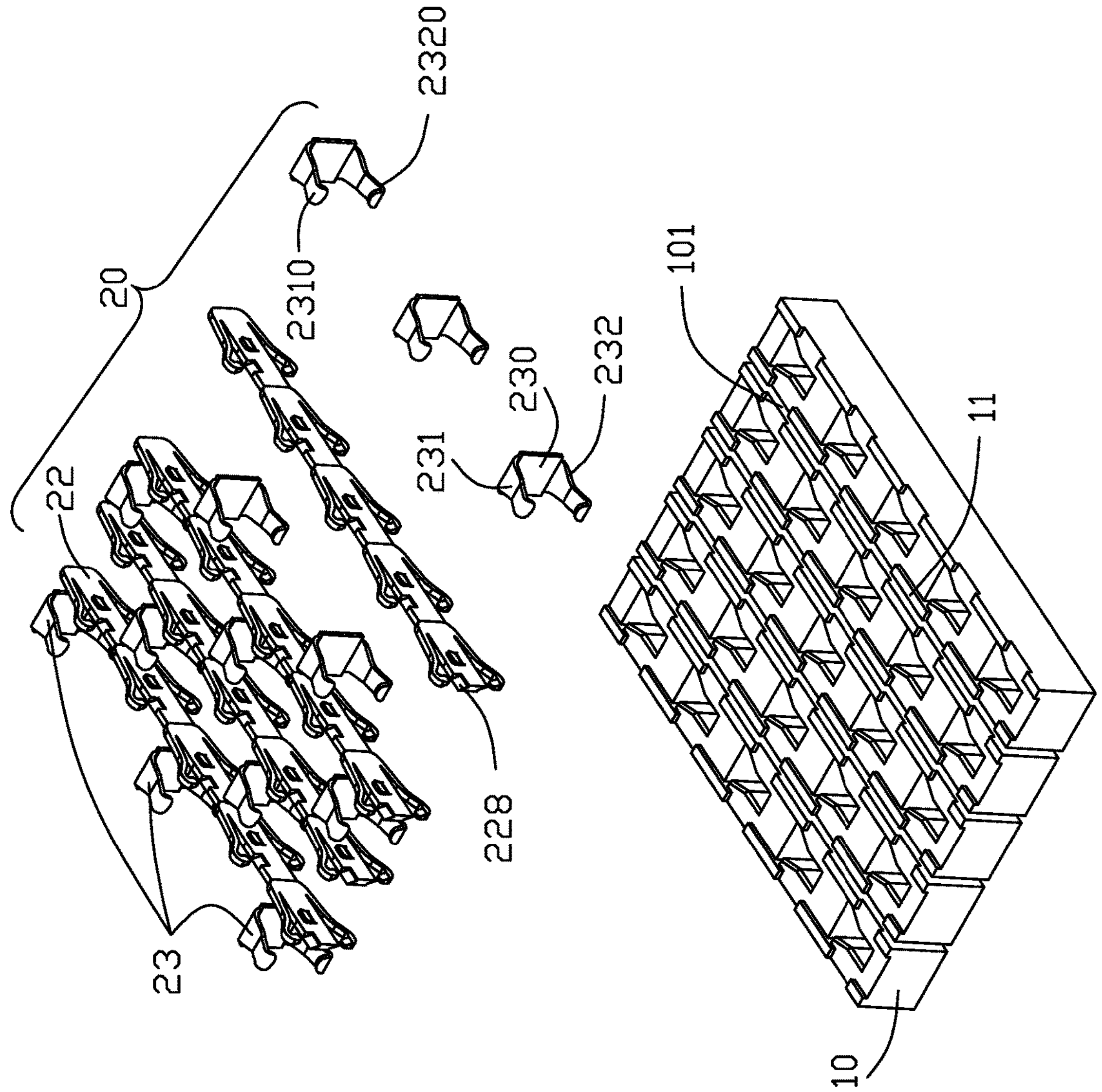
FIG. 2 is an exploded perspective view of the electrical connector of FIG. 1.
Figure 3:
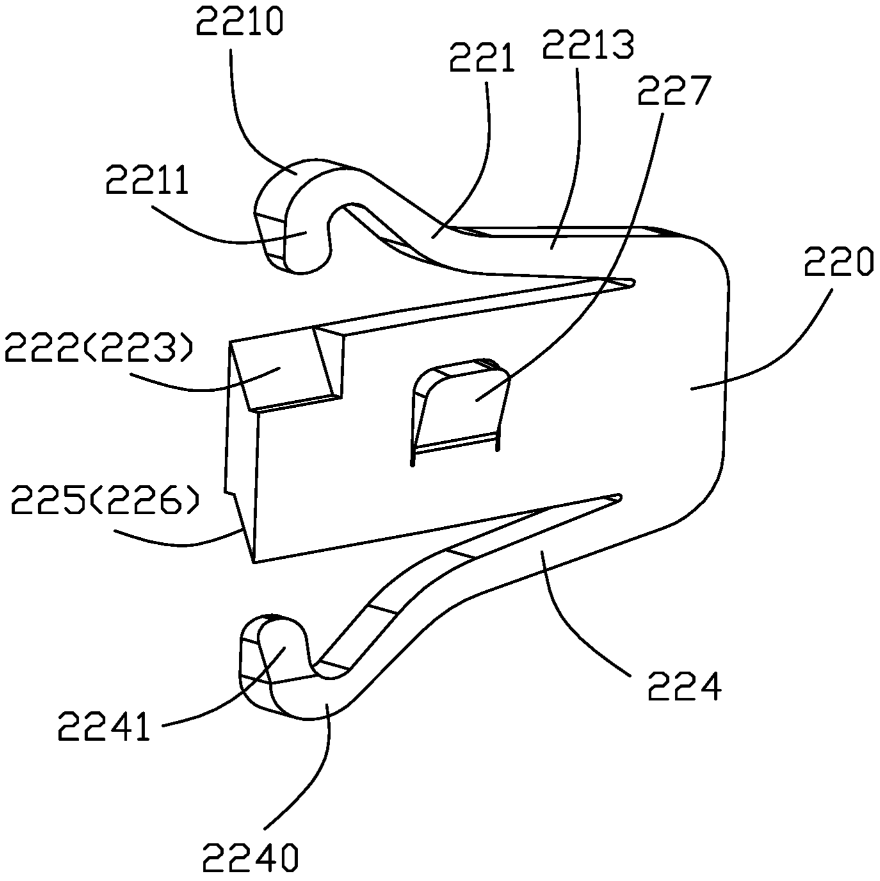
FIG. 3 is a perspective view of a grounding terminal.
Figure 4:
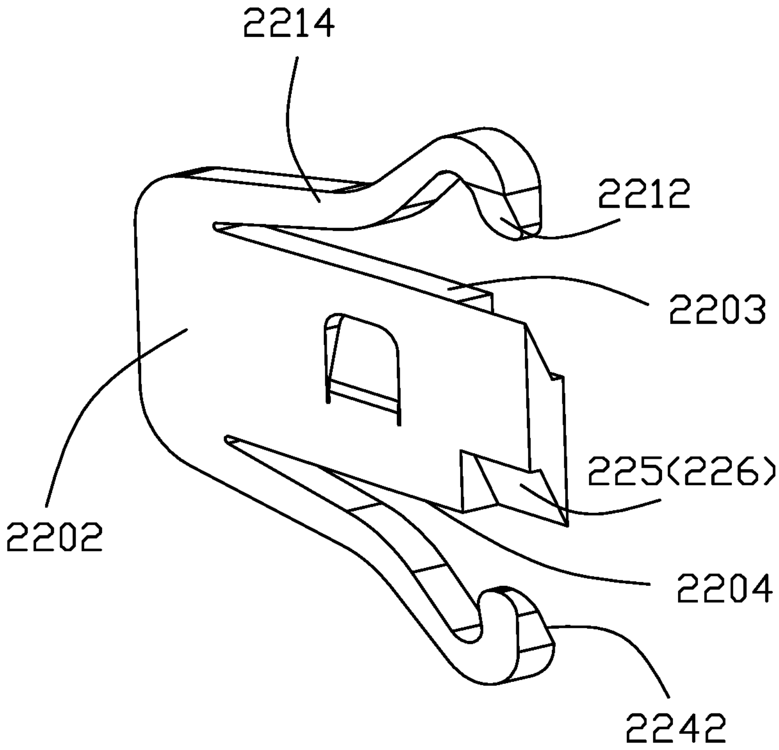
FIG. 4 is another perspective view of the grounding terminal of FIG. 3.
Figure 5:
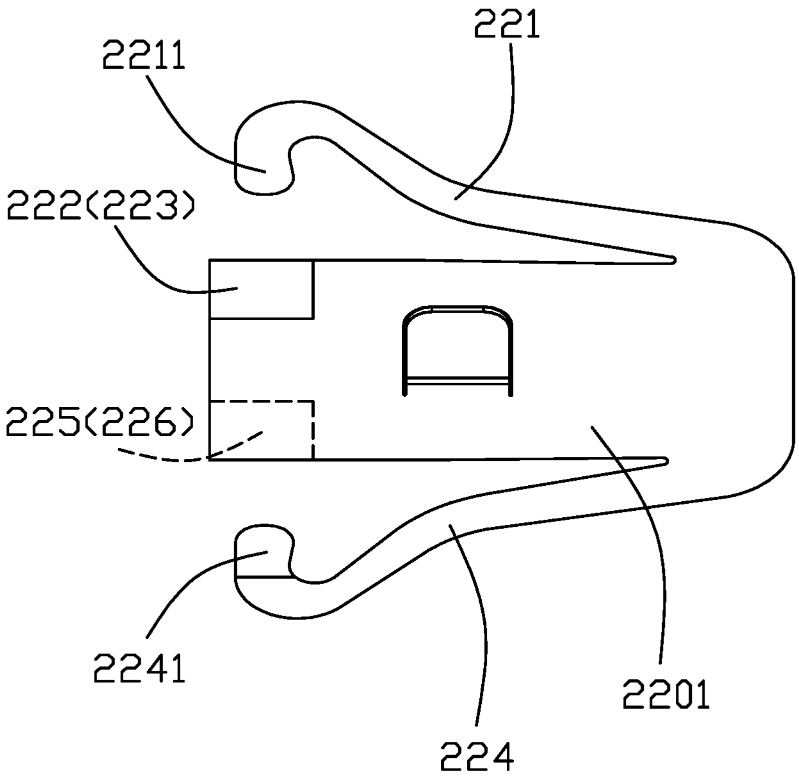
FIG. 5 is a side view of the grounding terminal of FIG. 3.

Referring to FIGS. 1-3 showing a first embodiment of this invention, an electrical connector 100 for connecting an electronic package to a main board, includes an insulative housing 10 and a plurality terminals 20 which include a plurality of first terminals or grounding terminals 22 and second terminals or signal terminals 23 received in the insulative housing 10. The signal terminals 23 are arranged in a matrix and a row of the grounding terminals 22 arranged in a same upright plane are located on one side of the signal terminals 23, that means every two rows of the signal terminals 23 are shielded with the row of grounding terminals 11. Each of the signal terminals 23 includes a main part 230 extending upright and laterally, an upper elastic arm 231 extending upward with an upper contacting portion 2310 protruding upward beyond a top face of the housing and a lower elastic arm 232 protruding downward with a lower contacting portion 2320 protruding downward beyond a bottom face of the housing from the main part 230 respectively.

Referring to FIGS. 3-6, each of the grounding terminals 22 includes a main part 220 extending upright and transversely, an upper elastic arm 221 and lower elastic arms 224. The upper elastic arm 221 defines an upper contacting portion 2210 protruding upward and an upper end 2211 extending downwardly from the upper contacting portion 2210. The lower elastic arm 224 defines a lower contacting portion 2240 protruding downward and a lower end 2211 extending upwardly from the lower contacting portion 2240, preferably. In this embodiment, the grounding terminal 22 is blanked with metal plate in a plate-shape, that is, the entire grounding terminal 22 is in same plane. The main part 220 of the grounding terminals 22 defines a first upright face 2201, a second upright face 2202 opposite to the first upright face 2201, and an upper face 2203 and a lower face 2204 opposite to the upper face 2203, the first upright face 2201 or the second upright face 2202 has a greater area than that of the upper face 2203 or the lower face 2204. The upper elastic arm 221 extends obliquely from one end of the upper face 2203 and the lower elastic arm 224 extends obliquely from the other end of the lower face 2204, the upper and lower elastic arms 221, 224 are in a same plane with the main part 220. The upper and lower elastic arms 221, 224 of the grounding terminal 22 define a first upright face 2213 and a second upright face 2214 which are in a same plane with the first upright face and the second upright face 2201, 2202 respectively. The upper end 2211 has a first inclined face 2212 in an up-down direction which extends obliquely from the second upright face 2214 toward the first upright face 2213. The first contacting face of the upper end 2211 includes the first inclined face 2212.

Figure 6:
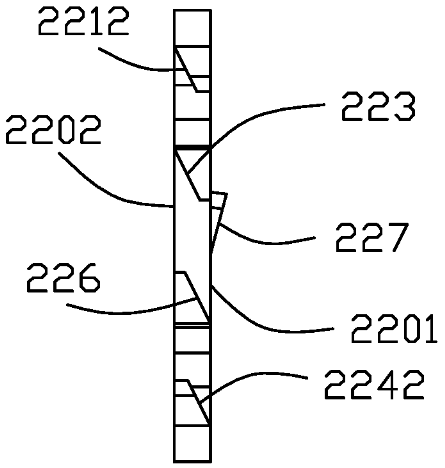
FIG. 6 is a front view of the grounding terminal of FIG. 3.
Figure 7:
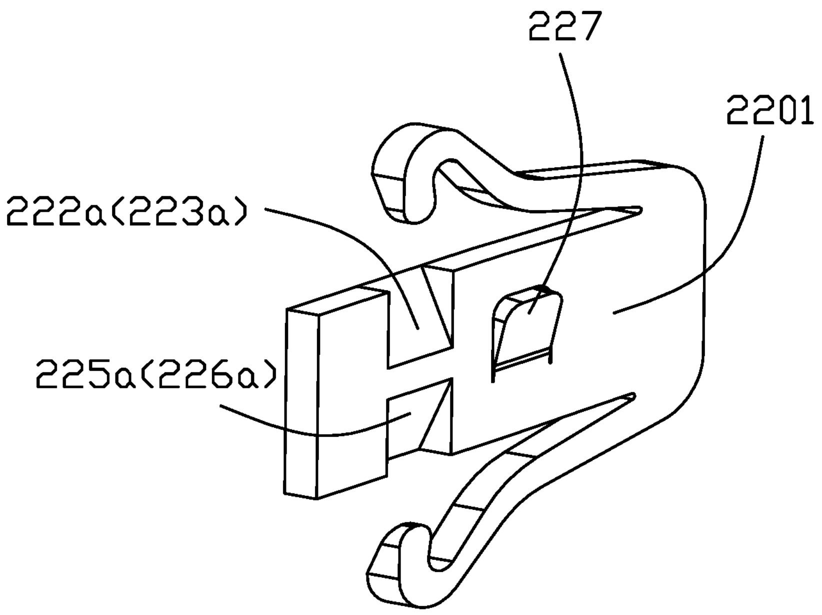
FIG. 7 is an perspective view of a grounding terminal in a second embodiment of the invention.
Figure 8:
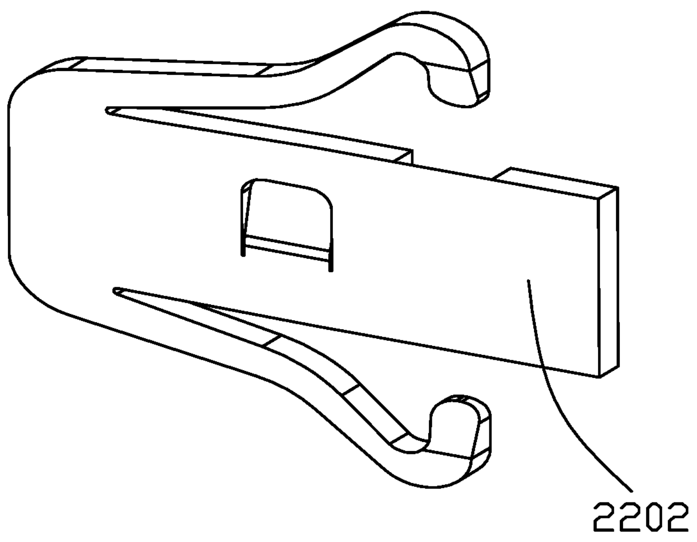
FIG. 8 is another perspective view of the grounding terminal of FIG. 7.
Figure 9:
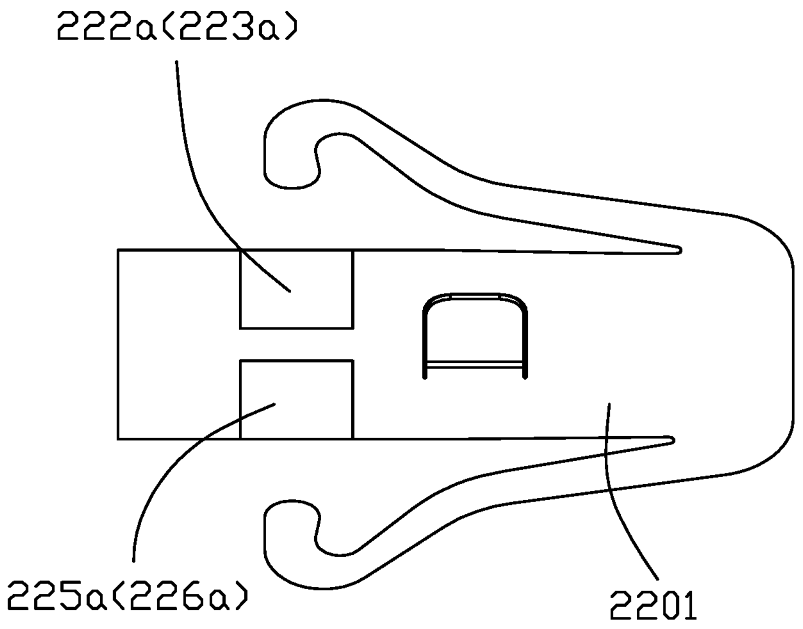
FIG. 9 is a side view of the grounding terminal of FIG. 7.
Figure 10:
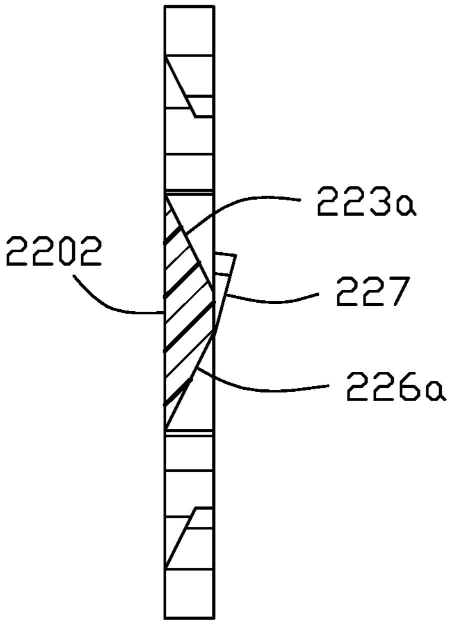
FIG. 10 is a front view of the grounding terminal of FIG. 7.

Referring to FIGS. 3-6, the main part 220 defines a first recess 222 penetrating the upper face 2203 for providing a receiving space for the upper end 2211 when the upper end 2211 moves downward. The first recess 222 also penetrates the first upright face 2201. A second inclined face 223 is defined in the first recess 222, which extends obliquely from the upper face 2203 or the second upright face 2202 to the first upright face 2201 in the first recess 222. That is, the second inclined face 223 extends obliquely and upwardly toward the upper face 2203 or the second upright face 2202 while extends obliquely and downwardly toward the first upright face 2201. The second inclined face 223 deviates from the second upright face 2202. The second inclined face 223 and the first inclined face 2212 are parallel and opposite to each other, as shown in FIG. 6. Thus, the upper end 2211 goes into the first recess 222 and the first inclined face 2212 gets contact with the second inclined face 223. The first inclined face 2212 can get contact with the second inclined face 223 within a wide range of press as both the first inclined face 2212 and the second inclined face 223 are inclined face.

That is, the upper end 2211 defines a first contacting face which can include the first inclined face 2212, the main part 220 defines a second contacting face which can include the second inclined face 2241. The second contacting face abuts against the first contacting face when the upper elastic arm 221 is pressed and moves downward. Alternatively, it can be at least one of the first contacting face and the second contacting face being of an inclined face. Therefore, there's a larger proportion of accessible contacting area, the first contacting face can get contact with the second contacting face though the upper elastic arms 231 of the grounding terminals 22 may suffer different degrees of pressure due to their improper installation into the insulative housing 10. In other embodiments, to increase a pressing area of the upper elastic arm 221, the upper end 2211 in the first recess 222 can further move out from the first recess 222 to contact with the first upright face 2201, so the second contacting face further includes the first upright face 2201 in addition to the second inclined face 223 in the first recess 222.

Similar to the upper elastic arm 221, the lower end 2241 of the lower elastic arm 224 has a third contacting face (not labeled), and the main part 220 has a fourth contacting face (not labeled), at least one of the third contacting face and the fourth contacting face is of an inclined face which would lead the lower elastic arm 224 to get contact with the main part 220 easily and firmly when the lower elastic arm 224 is pressed and moves upward. Preferably, the main part 220 defines a second recess 225 going through the lower end face 2204 to provide a receiving space for receiving a lower end 2241 of the lower elastic arm 224. The third contacting face includes a third inclined face 2242 of the lower end 2241 of the lower elastic arm 224 and the fourth contacting face includes the fourth inclined face 226 which extends obliquely in the second recess 225. The third inclined face 2242 of the lower end 2241 of the lower elastic arm 224 and the fourth inclined face 226 have a same inclination direction, thus, they are parallel and can get contact with each other when the lower end 2241 moves upward.

Referring to FIGS. 3-6, the second recess 225 goes through the second upright face 2202 as well as the lower face 2204. The fourth inclined face 226 extends obliquely from the lower face 2204 or the first upright face 2201 toward the second upright face 2201, that is, the fourth inclined face 226 extends obliquely and upwardly toward the second upright face 2202 while obliquely and downwardly toward the first right face 223 or the lower face 2204. The fourth inclined face 226 deviates from the first right face 2201. It is known that the first recess 222 and the second recess 225 are recessed from opposite upright faces of the main part 220 respectively in a left-right direction, the second recess 225 is located below the first recess 222. Thus, the grounding terminal 22 can not only keep balance in the up-down direction but also in the left-right direction when the upper and lower elastic arms 221, 224 are pressed to contact the third and fourth inclined faces 223, 226 of the main part 220 respectively. In order to simplify the grounding terminals 22, the upper end 2211 of the upper elastic arm 221 is bent vertically downward (clearly shown in FIG. 5) and is located above the first recess 222 and the lower end 2241 of the lower elastic arm 224 is bent upward vertically and is located below the second recess 225. A retaining bar 227 is punched in the transverse direction, which protrude beyond the first upright face 2201, alternatively, the retaining bar 227 can be punched beyond the second upright face 2202, for firmly fixing the grounding terminals in the insulative housing 1. To enable the upper and lower elastic arms 211, 224 to smoothly enter into the first recess 222 and the second recess 225 respectively, the first and second recess 222, 225 are transversely wider than the lower and the upper ends 2241, 2211 respectively.

Referring to FIGS. 7-10 showing a second embodiment of the grounding terminal 22, in the first embodiment the first recess 222 and the second recess 225 are located in opposite upright faces 2201, 2202 of the main part 220 respectively in the left-right direction, the first recess **222*a* and the second recess 225*a* are both located at the first vertical face 2201 in this second embodiment. The second inclined face 223*a* extends obliquely from the second upright face 2202 or the upper face 2203 to the first upright face 2201, that is, the second inclined face 223*a* extends upwardly and obliquely toward the second upright face 2202 or the upper face 2203 and extends downwardly and obliquely toward the first upright face 2201, thus, the second inclined face 223*a* deviates from the second upright face 2202; the fourth inclined face 226*a* extends from the lower face 2204 or the second upright face 2202 toward the first upright face 2201, thus, the fourth inclined face 226*a* deviates from the second upright face 2202** too.

Figure 11:
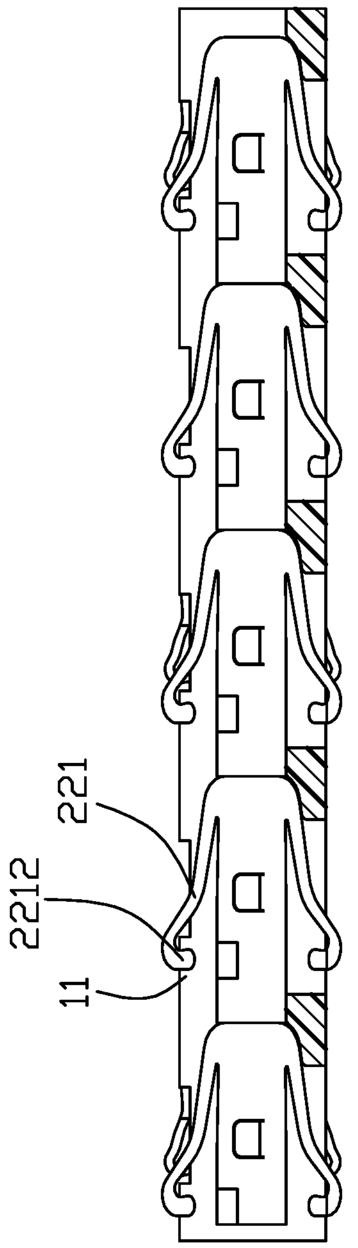
FIG. 11 is a cross-sectional view of the electrical connector taken along line 11-11 in FIG. 1.

Referring to FIGS. 1-2 and 11, the grounding terminals 22 arranged in a row in the transverse direction are connected with each other to form an integral shielding member 228 for a better shielding of the signal terminals 23. The insulative housing 10 defines a plurality of grooves 101 go through the upper and lower surfaces of the insulative housing 10, the shielding members 228 are received and retained in the grooves 101. The insulative housing 10 defines a plurality of ribs 11 on the upper and lower faces thereof, the grooves 101 go across the ribs 11 in the transverse direction. Thus, the first inclined face 2212 of the upper end 2211 and the third inclined face 2242 of the lower end 2241 are limited by the corresponding ribs 11 in a lateral direction per perpendicular to the transverse direction. Preferably, the signal terminal 23 is formed by forming and bending a metal plate and the grounding terminal 22 is made by pouring or cutting from a metal sheet, etc.

It should be noted that the grounding terminals 22 can also be in other shapes. For example, the main part 220 can be in substantially a U-shape which includes a first upright part, a second upright part and a junction part connecting the first upright part and the second upright part. The first recess 222 with the second inclined face **223*a* is provided in the second upright part, the upper elastic arm 221 with the first inclined face 2212 extends from the first upright part. In addition, the first upright part can also be provided with the lower elastic arm 224 with third inclined face 2242 while the second upright part is equipped with the second recess 225 with a second inclined face 226**.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector comprising:

an insulative housing; and a plurality of first terminals disposed in the insulative housing, each of the first terminals comprising a main part retained in the housing and an upper elastic arm extending obliquely and upwardly from the main part, the upper elastic arm having an upper-arc contacting portion and an upper end bending downward from the upper-arc contacting portion;

wherein the upper end defines a first contacting face, the main part defines a second contacting face confronting with the first contacting face, at least one of the first contacting face and the second contacting face is of an inclined face to guide the upper end of the upper elastic arm to contact with the main part, and the first and second contacting faces contact with each other when the upper elastic arm moves toward the main part; and wherein the first terminal comprises a lower elastic arm extending obliquely and downwardly from the main part with a lower-arc contacting portion and a lower end bending upward from lower-arc contacting portion, the lower end defines a third inclined face, the main part defines a second recess passing through the lower face thereof, and the second recess defines a fourth inclined face confronting with and parallel to the third inclined face.

2. The electrical connector as claimed in claim 1, wherein the main part defines an upper face, a lower face opposite to the upper face, a first upright face, and a second upright face opposite to the first upright face, the first or the second upright face is larger than that of the upper face or the lower face in dimension, and the upper elastic arm extends from one end of the upper face.

3. The electrical connector as claimed in claim 1, wherein the first terminals are grounding terminals arranged in a row and connected with each other to form an integral shielding member, the insulative housing defines a groove through an upper surface and a lower surface thereof, and the integral shielding member is received and retained in the groove.

4. The electrical connector as claimed in claim 3, wherein the insulative housing defines plural pairs of ribs at the upper surface thereof and at opposite sides of the grooves, and the upper ends of the plurality of upper elastic arms are limited between the plural pairs of ribs.

5. The electrical connector as claimed in claim 1, wherein the upper end defines a first inclined face, the main part defines a first recess through the upper face and a second inclined face, the first contacting face includes the first inclined face, and the second contacting face includes the second inclined face.

6. The electrical connector as claimed in claim 5, wherein the first recess extends through the first upright face, and the second inclined face deviates from the second upright face.

7. The electrical connector as claimed in claim 6, wherein the upper elastic arm defines a first upright face in a same plane with the first upright face and a second upright face in a same plane with the second upright face, and the first inclined face deviates from the first upright face of the upper elastic arm.

8. The electrical connector as claimed in claim 7, wherein the first inclined face and the second inclined face are parallel to each other.

9. The electrical connector as claimed in claim 1, wherein the upper end of the upper elastic arm bends downward vertically from the upper-arc contacting portion.

10. An electrical connector comprising:

an insulative housing;

signal terminals disposed in the insulative housing; and grounding terminals disposed in the insulative housing and located proximate to corresponding signal terminals, the grounding terminal comprising a main part extending in an upright direction and a transverse direction and an upper elastic arm extending obliquely and upwardly from an upper face of the main part, the upper elastic arm defining an upper-arc contacting portion and an upper end bending from the upper-arc contacting portion;

wherein the main part defines a first recess going through the upper face, and the upper end of the upper elastic arm is operable to move downward to enter the first recess.

11. The electrical connector as claimed in claim 10, wherein the upper end of the upper elastic arm defines a first inclined face, the first recess defines a second inclined face, and the first inclined face contacts with the second inclined face when the upper elastic arm moves downwards.

12. The electrical connector as claimed in claim 11, wherein the first inclined face confronts with the second inclined face.

13. The electrical connector as claimed in claim 11, wherein the main part defines opposite first upright face and second upright face connecting between the upper face and a lower face of the main part, and the first recess goes through the first upright face.

14. The electrical connector as claimed in claim 10, further comprising a lower elastic arm extends obliquely and upwardly from a lower face of the main part, and wherein the lower elastic arm defines a lower-arc contacting portion and a lower end bending from the lower-arc contacting portion.

15. The electrical connector as claimed in claim 14, wherein the main part defines a second recess with a fourth inclined face, and the lower end moves into the second recess along the fourth inclined face.

16. The electrical connector as claimed in claim 15, wherein the second recess is located at a diagonal of the first recess.

17. The electrical connector as claimed in claim 10, wherein the grounding terminals are arranged in a row in the transverse direction and connected with each other by the main parts, the row of grounding terminals are in a same plane, and the signal terminal comprises a main part extending in the upright direction and a lateral direction perpendicular to the transverse direction.

18. An electrical connector comprising:

an insulative housing; and a plurality of first terminals disposed in the insulative housing, each of the first terminal comprising a main part retained in the housing and an upper elastic arm and a lower elastic arm;

wherein the main part defines a first recess opening upwards and a second recess opening downward, and a distal end of the upper elastic arm moves into the first recess when the upper elastic arm moves downwards and a distal end of the lower elastic arm moves into the second recess when the lower elastic arm moves in the second recess.

19. The electrical connector as claimed in claim 18, wherein the first recess and the second recess are located at a diagonal line of the main part.

20. An electrical connector comprising:

an insulative housing; and a plurality of first terminals disposed in the insulative housing, each of the first terminals comprising a main part retained in the housing and an upper elastic arm extending obliquely and upwardly from the main part, the upper elastic arm having an upper-arc contacting portion and an upper end bending downward from the upper-arc contacting portion;

wherein the upper end defines a first contacting face, the main part defines a second contacting face confronting with the first contacting face, at least one of the first contacting face and the second contacting face is of an inclined face to guide the upper end of the upper elastic arm to contact with the main part, and the first and second contacting faces contact with each other when the upper elastic arm moves toward the main part;

wherein the main part defines an upper face, a lower face opposite to the upper face, a first upright face, and a second upright face opposite to the first upright face, the first or the second upright face is larger than that of the upper face or the lower face in dimension, and the upper elastic arm extends from one end of the upper face; and wherein the first terminals are grounding terminals arranged in a row and connected with each other to form an integral shielding member, the insulative housing defines a groove through an upper surface and a lower surface thereof, and the integral shielding member is received and retained in the groove.

* * * * *